US009294231B2

(12) United States Patent
Malladi et al.

(10) Patent No.: US 9,294,231 B2
(45) Date of Patent: Mar. 22, 2016

(54) CONFIGURABLE ACKNOWLEDGEMENT PROCESSING IN A WIRELESS COMMUNICATION SYSTEM

(75) Inventors: Durga Prasad Malladi, San Diego, CA (US); Byoung-Hoon Kim, Seoul (KR)

(73) Assignee: QUALCOMM Incorporated, San Diego, CA (US)

( * ) Notice: Subject to any disclaimer, the term of this patent is extended or adjusted under 35 U.S.C. 154(b) by 1229 days.

(21) Appl. No.: 12/047,562

(22) Filed: Mar. 13, 2008

(65) Prior Publication Data

US 2008/0253318 A1 Oct. 16, 2008

Related U.S. Application Data

(60) Provisional application No. 60/895,454, filed on Mar. 17, 2007.

(51) Int. Cl.
*H04L 1/16* (2006.01)
*H04L 1/00* (2006.01)
*H04L 1/18* (2006.01)

(52) U.S. Cl.
CPC ............ *H04L 1/1671* (2013.01); *H04L 1/0026* (2013.01); *H04L 1/0057* (2013.01); *H04L 1/1854* (2013.01); *H04L 1/0073* (2013.01); *H04L 1/1812* (2013.01)

(58) Field of Classification Search
CPC . H04W 28/04; H04W 72/042; H04W 74/006; H04W 74/04; H04W 76/048; H04W 92/10; H04L 1/1803; H04L 1/1806; H04L 1/1809; H04L 1/1812; H04L 1/1829; H04L 1/1854; H04L 1/1861; H04L 1/1864; H04L 1/1867; H04L 1/1896; H04L 1/20; H04L 5/0055
USPC .......... 370/310–350, 478–482; 455/450–452, 455/452.1; 714/48, 748–752
See application file for complete search history.

(56) References Cited

U.S. PATENT DOCUMENTS

| | | | |
|---|---|---|---|
| 7,227,854 B2 | 6/2007 | Kim et al. | |
| 2003/0076783 A1* | 4/2003 | Das et al. | 370/236 |

(Continued)

FOREIGN PATENT DOCUMENTS

| | | |
|---|---|---|
| CN | 1669260 A | 9/2005 |
| EP | 1225780 A2 | 7/2002 |

(Continued)

OTHER PUBLICATIONS

R1-060155, 3GPP TSG-RAN WG1 WG1 LTE Ad Hoc Meeting, Scheduling and Multiplexing of CQI and ACK/NACK Feedback for Single Carrier FDMA in Evolved UTRA Uplink, Helsinki, Finland, Jan. 23-25, 2006, pp. 1-8.*

(Continued)

*Primary Examiner* — Un C Cho
*Assistant Examiner* — Jeremy Costin
(74) *Attorney, Agent, or Firm* — Liem T. Do

(57) ABSTRACT

Techniques for sending and receiving acknowledgement (ACK) information in a wireless communication system are described. A base station sends control information and data to a user equipment (UE) and receives ACK information from the UE. The base station performs detection for the ACK information based on (i) a first hypothesis for the control information being missed by the UE and (ii) a second hypothesis for the control information being received correctly by the UE. In one design, the ACK information may have a variable size, and the base station may perform detection for the ACK information based on different block codes for the first and second hypotheses. In another design, the ACK information may have a fixed size, and the base station may perform detection for the ACK information based on a single block code and obtain a fixed number of bits for the ACK information for both hypotheses.

52 Claims, 9 Drawing Sheets

(56) References Cited

U.S. PATENT DOCUMENTS

| | | | |
|---|---|---|---|
| 2003/0123396 A1* | 7/2003 | Seo et al. | 370/252 |
| 2003/0123409 A1 | 7/2003 | Kwak et al. | |
| 2004/0058687 A1* | 3/2004 | Kim et al. | 455/452.2 |
| 2004/0109433 A1* | 6/2004 | Khan | 370/345 |
| 2004/0141460 A1* | 7/2004 | Holtzman et al. | 370/216 |
| 2005/0032536 A1 | 2/2005 | Wei | |
| 2005/0213575 A1* | 9/2005 | Shin et al. | 370/389 |
| 2005/0250540 A1* | 11/2005 | Ishii et al. | 455/561 |
| 2006/0233127 A1* | 10/2006 | Derryberry et al. | 370/328 |
| 2006/0252452 A1 | 11/2006 | Umesh et al. | |
| 2007/0183380 A1* | 8/2007 | Rensburg et al. | 370/338 |
| 2007/0183384 A1* | 8/2007 | Kwak et al. | 370/338 |
| 2008/0200196 A1* | 8/2008 | Muharemovic et al. | 455/512 |

FOREIGN PATENT DOCUMENTS

| | | |
|---|---|---|
| JP | 2004519904 A | 7/2004 |
| JP | 2005523669 A | 8/2005 |
| JP | 2005525744 A | 8/2005 |
| JP | 2005318470 A | 11/2005 |
| JP | 2006295912 A | 10/2006 |
| KR | 20040106541 | 12/2004 |
| RU | 2262194 | 10/2005 |
| RU | 2006106914 A | 8/2006 |
| TW | I246260 | 12/2005 |
| WO | 03096598 | 11/2003 |
| WO | 2006109125 | 10/2006 |

OTHER PUBLICATIONS

3GPP TSG RAN WG1 LTE AD HOC, R1-061672; "Coding Scheme of L1/L2 Control Channel for E-UTRA Downlink", NTT Docomo et al., Cannes, France, Jun. 27-30, 2006.

International Search Report—PCT/US08/057160, International Search Authority—European Patent Office—Aug. 13, 2008.

Written Opinion—PCT—US08/057160, International Search Authority—European Patent Office—Aug. 13, 2008.

Taiwan Search Report—TW097109351—TIPO—Mar. 2, 2012.

* cited by examiner

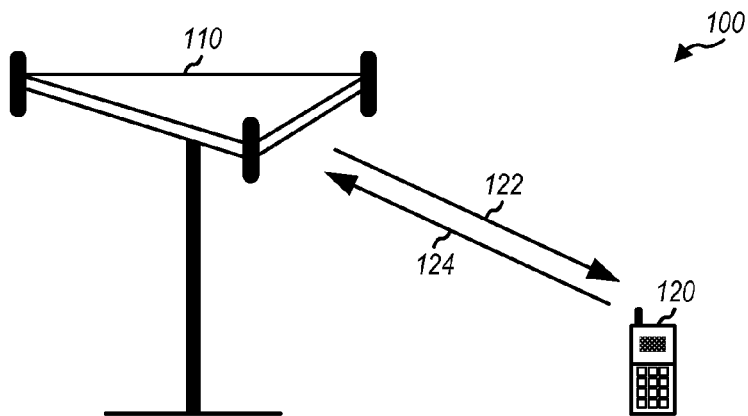
FIG. 1
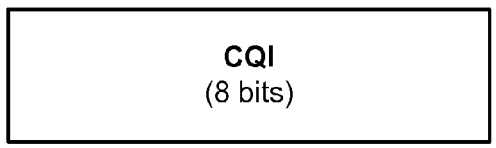
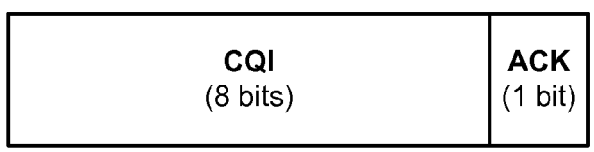
1 = ACK for codeword
0 = NAK for codeword
[0, 0] = NAKs for both codewords
[0, 1] = ACK for only 2nd codeword
[1, 0] = ACK for only 1st codeword
[1, 1] = ACKs for both codewords
FIG. 3

610

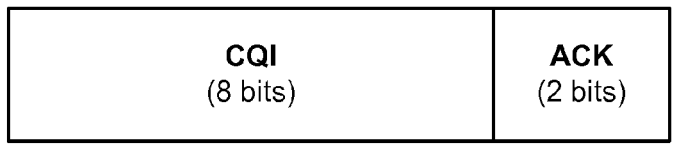

[0, 0] = Missed PDCCH
[0, 1] = ACKs for both codewords
[1, 0] = ACK for only 1st codeword
[1, 1] = NAKs for both codewords

620

[0, 0] = Missed PDCCH
[0, 1] = ACKs for both codewords
[1, 0] = ACK for only 2nd codeword
[1, 1] = NAKs for both codewords

630

[0, 0] = Missed PDCCH
[0, 1] = ACK for only 2nd codeword
[1, 0] = ACK for only 1st codeword
[1, 1] = ACKs for both codewords

640

[0, 0] = Missed PDCCH
[$x$, 1] = ACK/NAK for 1st codeword
[1, $x$] = ACK/NAK for 2nd codeword
$x = 1$ for ACK and $x = 0$ for NAK

*FIG. 6*

CONFIGURABLE ACKNOWLEDGEMENT PROCESSING IN A WIRELESS COMMUNICATION SYSTEM

The present application claims priority to provisional U.S. Application Ser. No. 60/895,454, entitled "WIRELESS TRANSMISSION SYSTEM USING AN UPLINK SIGNAL HAVING COMBINED CHANNEL QUALITY INDEX AND CONTROL CHANNEL ACKNOWLEDGEMENT INFORMATION," filed on Mar. 17, 2007, assigned to the assignee hereof and incorporated herein by reference.

BACKGROUND

I. Field

The present disclosure relates generally to communication, and more specifically to techniques for sending and receiving acknowledgement (ACK) information in a wireless communication system.

II. Background

Wireless communication systems are widely deployed to provide various communication content such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

In a wireless communication system, a base station may transmit data to a user equipment (UE) on the downlink and/or receive data from the UE on the uplink. The downlink (or forward link) refers to the communication link from the base station to the UE, and the uplink (or reverse link) refers to the communication link from the UE to the base station. The UE may send channel quality indicator (CQI) information indicative of the downlink channel quality to the base station. The base station may select a rate or transport format based on the CQI information and may send data at the selected rate or transport format to the UE. The UE may send ACK information for data received from the base station. The base station may determine whether to retransmit pending data or to transmit new data to the UE based on the ACK information. It is desirable to reliably send and receive the ACK information in order to achieve good performance.

SUMMARY

Techniques for sending and receiving ACK information in a wireless communication system are described herein. A base station may send control information to a UE and may send data in accordance with the control information to the UE. The UE may jointly encode CQI and ACK information based on a block code and may send the CQI and ACK information to the base station. The base station may perform detection for the ACK information based on (i) a first hypothesis for the control information being missed by the UE and (ii) a second hypothesis for the control information being received correctly by the UE.

In one design, the ACK information may have a variable size. The base station may perform detection for the ACK information based on a first block code for the first hypothesis and based on a second block code for the second hypothesis. The base station may send one or two codewords of data to the UE. The base station may perform detection for the ACK information based on one block code if one codeword is sent and based on another block code if two codewords are sent. The base station may obtain a first number of bits (e.g., zero bits) for the ACK information for the first hypothesis and may obtain a second number of bits (e.g., one or two bits) for the ACK information for the second hypothesis. The second number of bits may be dependent on the number of codewords sent to the UE.

In another design, the ACK information may have a fixed size. The base station may perform detection for the ACK information based on a single block code for both the first and second hypotheses. The base station may obtain a fixed number of bits (e.g., two bits) for the ACK information for both hypotheses and regardless of the number of codewords sent to the UE. The two bits may be defined based on one format if two codewords are sent and based on another format if one codeword is sent. One 2-bit value may indicate that the control information is missed by the UE. The remaining 2-bit values may convey decoding status of the one or two codewords sent to the UE.

The UE may perform the complementary processing to generate and send the CQI and ACK information, as described below. Various aspects and features of the disclosure are also described in further detail below.

BRIEF DESCRIPTION OF THE DRAWINGS

FIG. 1 shows a wireless communication system.

FIG. 3 shows three formats for variable-size CQI and ACK information.

FIG. 6 shows four formats for fixed-size CQI and ACK information.

DETAILED DESCRIPTION

Figure 2:
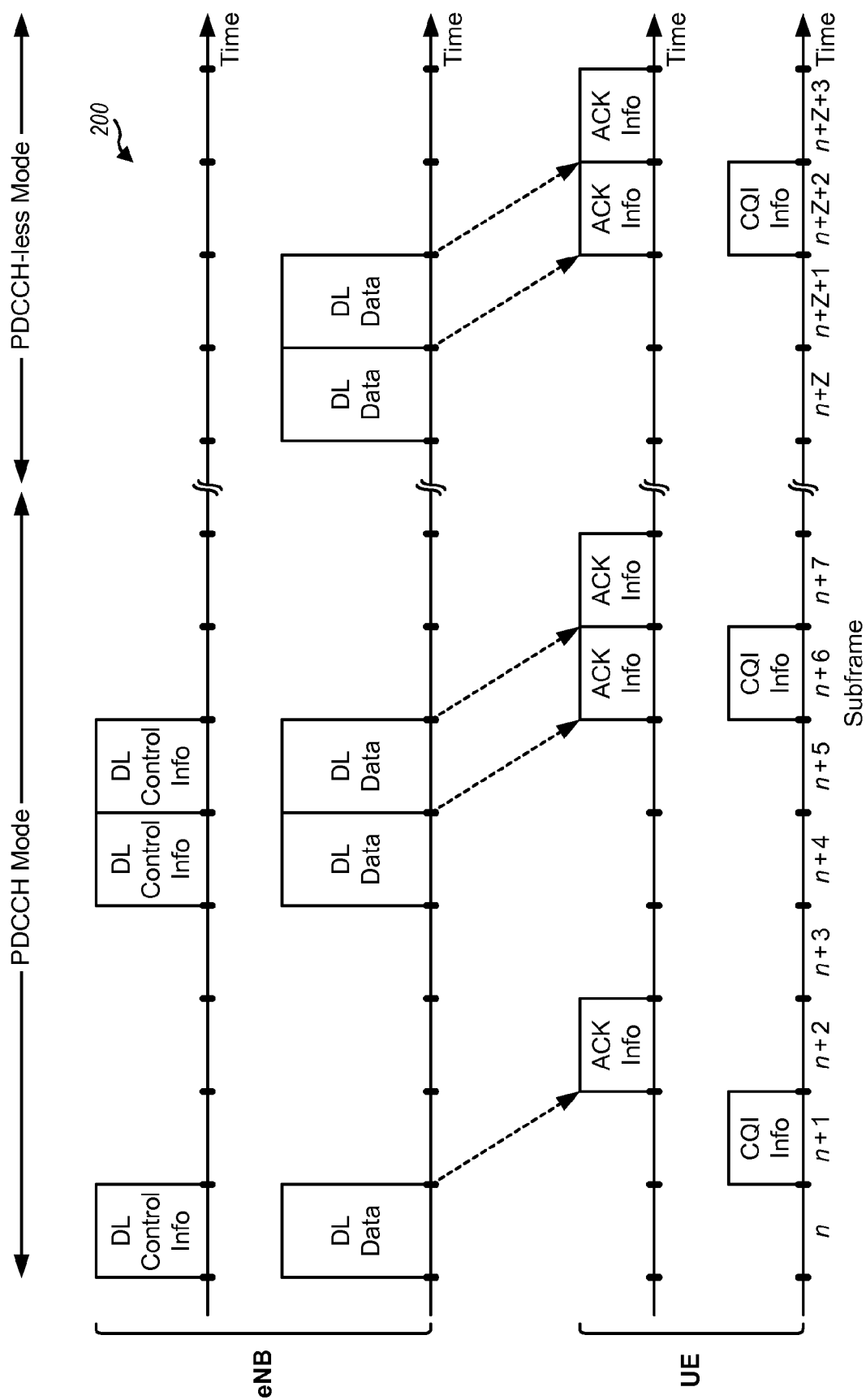
FIG. 2 shows downlink data transmission and associated control information.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). cdma2000 and UMB are described in documents from an organization named "3rd Generation Partnership Project 2" (3GPP2). For clarity, certain aspects of the techniques are described below for LTE, and LTE terminology is used in much of the description below.

FIG. 1 shows a wireless communication system 100. For simplicity, only one evolved Node B (eNB) 110 and only one UE 120 are shown in FIG. 1. eNB 110 is a station that communicates with UEs and may also be referred to as a Node B, a base station, an access point, etc. UE 120 may be stationary or mobile and may also be referred to as a mobile station, a terminal, an access terminal, a subscriber unit, a station, etc. UE 120 may be a cellular phone, a personal digital assistant (PDA), a wireless modem, a wireless communication device, a handheld device, a laptop computer, a cordless phone, etc. UE 120 may communicate with eNB 110 via downlink 122 and/or uplink 124. UE 120 may receive data and control information from eNB 110 via downlink 122 and may transmit data and control information via uplink 124.

The system may support a set of physical channels for the downlink and another set of physical channels for the uplink. Each physical channel may carry data, control information, etc. Table 1 lists some physical channels used in LTE for the downlink and uplink.

TABLE 1

| Channel | Channel Name | Description |
|---|---|---|
| PDCCH | Physical Downlink Control Channel | Carry scheduling assignments and other control information on the downlink for different UEs. |
| PDSCH | Physical downlink shared channel | Carry data on the downlink to different UEs. |
| PUCCH | Physical uplink control channel | Carry control information (e.g., ACK and CQI information) sent by a UE on the uplink. |
| PUSCH | Physical uplink shared channel | Carry data sent by a UE on the uplink. |

The system may support operation of UE 120 in a PDCCH mode or a PDCCH-less mode. In the PDCCH mode, eNB 110 may send control information on the PDCCH to the UE and may send data in accordance with the control information on the PDSCH to the UE. The UE may process the PDCCH to determine whether it has been scheduled and, if yes, to obtain control information sent to the UE. The UE may then process the PDSCH based on the control information obtained from the PDCCH. In the PDCCH-less mode, the UE may be preconfigured with certain parameters (e.g., specific time frequency locations, one or more transport formats, etc.) that might be used to send data to the UE. The eNB may send data to the UE based on the preconfigured parameters and does not send control information on the PDCCH. The UE may perform blind decoding of the PDSCH based on the preconfigured parameters to recover any data sent to the UE. The PDCCH-less mode may reduce signaling overhead.

The system may support transmission of data in transport blocks. A transport block may have a variable size and may also be referred to as a packet, a subpacket, a data block, etc. Each transport block may be encoded separately to obtain a corresponding codeword. A codeword may also be referred to as a coded packet, a coded subpacket, a coded block, etc. Each codeword may be decoded separately to obtain a decoded transport block.

The system may support Hybrid Automatic Repeat Request (HARQ). For HARQ on the downlink, the eNB may send a transmission for a codeword to the UE and may send one or more additional transmissions until the codeword is decoded correctly by the UE, or the maximum number of transmissions has been sent, or some other termination condition is encountered. HARQ may improve reliability of data transmission.

FIG. 2 shows downlink (DL) transmission by eNB 110 and uplink (UL) transmission by UE 120. The transmission timeline may be partitioned into subframes, with each subframe having a predetermined duration, e.g., one millisecond (ms). The UE may periodically estimate the downlink channel quality for the eNB and may send CQI information to the eNB. The eNB may use the CQI information and/or other information to select the UE for downlink transmission and to select a suitable transport format (e.g., a modulation and coding scheme) for the UE. The eNB may process a transport block to obtain a corresponding codeword and may send a transmission for the codeword to the UE. The UE may process the transmission received from the eNB and may send an acknowledgement (ACK) if the codeword is decoded correctly or a negative acknowledgement (NAK) if the codeword is decoded in error. The eNB may send another transmission for the codeword if a NAK is received and may send a transmission for a new codeword if an ACK is received. FIG. 2 shows an example in which the ACK/NAK is delayed by two subframes. The ACK/NAK may also be delayed by some other amount.

In the following description, ACK information generically refers to ACK and/or NAK. CQI information generically refers to information indicative of channel quality.

As shown in FIG. 2, the UE may transmit only CQI information, or only ACK information, or both CQI and ACK information, or neither in any given subframe. The UE may send only CQI information on the PUCCH at a predetermined time frequency location, which may be assigned to the UE by the eNB. The UE may send only ACK information at a variable time frequency location, which may be determined based on an identifier (ID) of a downlink virtual resource block (VRB) used to send data to the UE or an ID of a PDCCH used to send control information to the UE. The UE may send both CQI and ACK information either (i) on the PUCCH at the time frequency location assigned for CQI information, if data is not sent on the uplink, or (ii) on the PUSCH along with data sent on the uplink. For clarity, much of the description below assumes that both CQI and ACK information is sent on the PUCCH or PUSCH.

In one design, eNB 110 may send one or two codewords to UE 120 in the PDCCH mode and may convey the number of codewords in the control information sent on the PDCCH. The eNB may send each codeword separately with HARQ. The UE may decode each codeword separately and may send ACK information for one or two codewords received from the eNB as described below. In one design, the eNB may send one codeword at a time to the UE in the PDCCH-less mode. In other designs, the eNB may send fewer or more codewords to the UE in the PDCCH mode and the PDCCH-less mode. For clarity, much of the description below assumes that either one or two codewords may be sent in the PDCCH mode and only one codeword may be sent in the PDCCH-less mode.

In one design, CQI information includes a 5-bit base CQI and a 3-bit delta CQI. The base CQI may indicate the CQI of the codeword decoded first by the UE, and the delta CQI may indicate the difference between the CQI of the codeword decoded first and the CQI of the codeword decoded second. The CQI information may also be sent with fewer or more bits and/or with other format. For clarity, much of the description below assumes eight bits of CQI information. In one design, the ACK information may comprise zero, one, or two bits. The ACK information may be sent using different formats, as described below.

In one design, K total bits for CQI and possibly ACK information may be encoded with a block code to obtain a fixed number of code bits for the CQI and possibly ACK information, where K may be 8, 9 or 10 for the design described above. In general, any (N, K) block code may be used to encode K information bits to generate N code bits. In one design, a (24, K) block code may be used to encode K information bits to generate 24 code bits. In another design, a (20, K) block code may be used to encode K information bits to generate 20 code bits. Other block codes may also be used to encode CQI and possibly ACK information. For clarity, much of the description below assumes the use of a (24, K) block code for CQI and possibly ACK information. The terms "block code" and "code" are used interchangeably herein.

FIG. 3 shows three formats for CQI and ACK information with a variable size. A format 310 includes eight bits for CQI information and no bits for ACK information. The eight bits for CQI information may be encoded with a (24, 8) code to obtain 24 code bits, which may be sent on the PUCCH or PUSCH.

A format 320 includes eight bits for CQI information and one bit for ACK information. The ACK bit may be set to '1' for an ACK to indicate that a codeword is decoded correctly or to '0' for a NAK to indicate that the codeword is decoded in error. The nine total bits for both CQI and ACK information may be jointly encoded with a (24, 9) code to obtain 24 code bits, which may be sent on the PUCCH or PUSCH.

A format 330 includes eight bits for CQI information and two bits for ACK information. One ACK bit may be assigned to a first codeword and may be set to '1' for an ACK to indicate that the first codeword is decoded correctly or to '0' for a NAK to indicate that the first codeword is decoded in error. The other ACK bit may be assigned to a second codeword and may be set to '1' for an ACK to indicate that the second codeword is decoded correctly or to '0' for a NAK to indicate that the second codeword is decoded in error. The 10 total bits for both CQI and ACK information may be jointly encoded with a (24, 10) code to obtain 24 code bits, which may be sent on the PUCCH or PUSCH.

The following scenarios may be encountered by the eNB and the UE:

Scenario 1
  The UE is not scheduled and no control information is sent on the PDCCH to the UE,
  The UE is not operating in the PDCCH-less mode,
  The eNB assumes that the (24, 8) code is used, and
  The UE transmits using the (24, 8) code.
Scenario 2
  The UE is scheduled and control information allocating one or two codewords is sent on the PDCCH to the UE,
  The UE correctly decodes the PDCCH,
  The eNB assumes that the (24, 9) or (24, 10) code is used, and
  The UE transmits using the (24, 9) or (24, 10) code.
Scenario 3
  The UE is scheduled and control information is sent on the PDCCH to the UE,
  The UE incorrectly decodes the PDCCH,
  The eNB assumes that the (24, 9) or (24, 10) code is used, and
  The UE transmits using the (24, 8) code.
Scenario 4
  The UE operates in the PDCCH-less mode,
  The eNB assumes that the (24, 8) or (24, 9) code is used, and
  The UE transmits using the (24, 8) or (24, 9) code.

In scenario 1, the UE is not scheduled for transmission on the downlink, and no control information is sent on the PDCCH to the UE. The UE transmits only CQI information using format 310 in FIG. 3 and the (24, 8) code. The eNB detects for CQI information based on the (24, 8) code.

In scenario 2, the UE is scheduled for transmission on the downlink, and the eNB sends control information allocating one or two codewords on the PDCCH to the UE. The UE correctly decodes the PDCCH and receives the control information. If the UE is allocated one codeword, then the UE transmits both CQI and ACK information for one codeword using format 320 and the (24, 9) code. If the UE is allocated two codewords, then the UE transmits both CQI and ACK information for two codewords using format 330 and the (24, 10) code. The eNB detects for CQI and ACK information based on the (24, 9) code if one codeword is allocated to the UE and based on the (24, 10) code if two codewords are allocated.

In scenario 3, the UE is scheduled for transmission on the downlink, and the eNB sends control information allocating one or two codewords on the PDCCH to the UE. However, the UE incorrectly decodes the PDCCH and misses the control information. The UE is not aware of the downlink transmission and thus transmits only CQI information using format 310 and the (24, 8) code. The eNB expects to receive both CQI and ACK information with the (24, 9) or (24, 10) code. Scenario 3 is an error scenario that may be handled as described below.

In scenario 4, the UE operates in the PDCCH-less mode. The eNB may transmit one codeword to the UE based on preconfigured parameters. The UE may perform blind decoding in each subframe in which the eNB can send a codeword to the UE. In one design, the UE sends only CQI information using format 310 and the (24, 8) code if a codeword is not decoded correctly and sends both CQI and ACK information using format 320 and the (24, 9) code if a codeword is decoded correctly. In this design, the UE sends a NAK using the (24, 8) code and sends an ACK using the (24, 9) code in the PDCCH-less mode. The eNB detects for only CQI information based on the (24, 8) code and also for both CQI and ACK information based on the (24, 9) code. In another design, the UE sends both CQI and ACK information using format 320 and the (24, 9) code for both ACK and NAK in the PDCCH-less mode.

Figure 4:
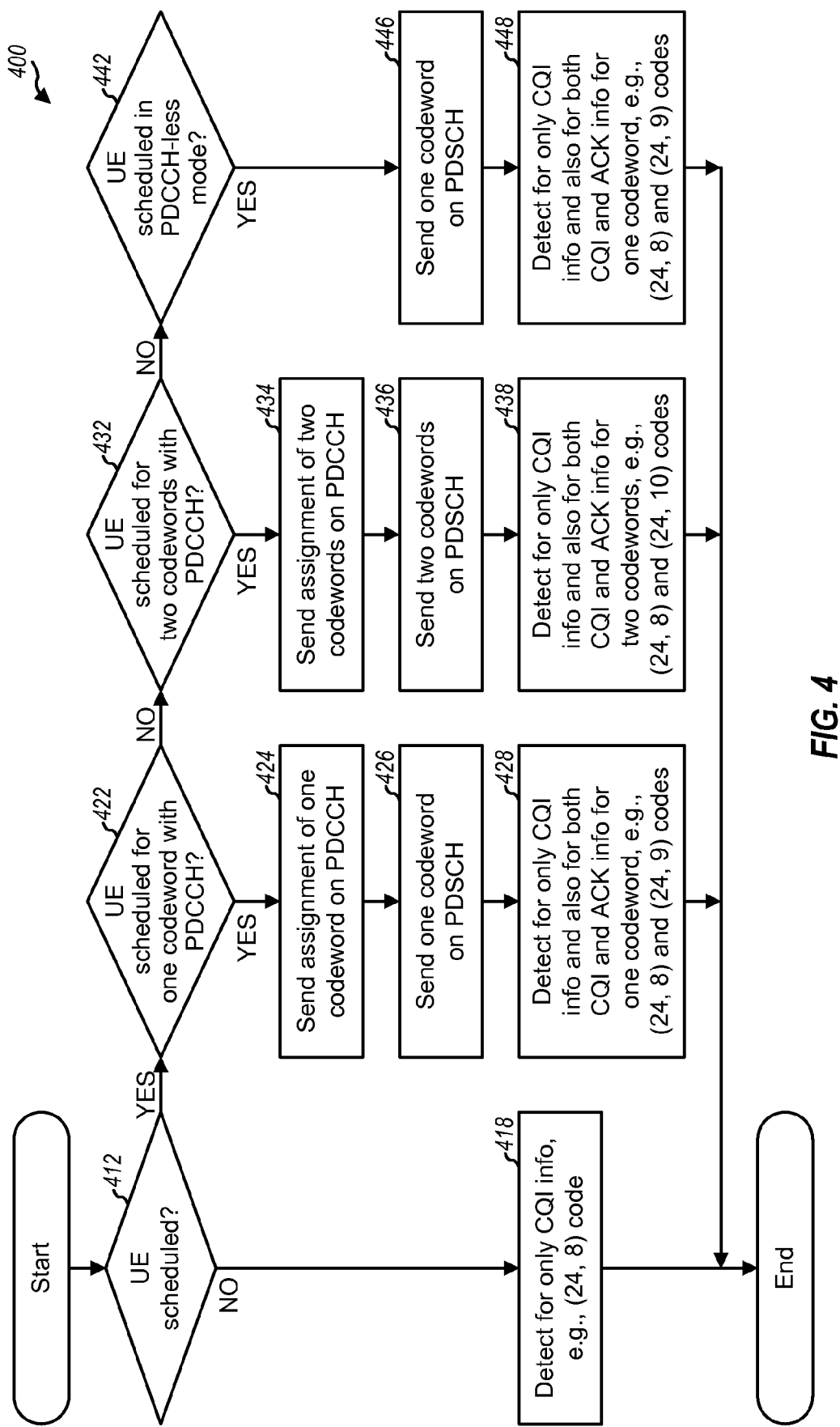
FIG. 4 shows a process for receiving variable-size CQI and ACK information.

FIG. 4 shows a design of a process 400 performed by the eNB to receive CQI and ACK information. The eNB may perform process 400 in each subframe in which data might be sent to the UE. The eNB may initially determine whether the UE is scheduled for downlink transmission (block 412). If the answer is 'No', then the eNB may detect for only CQI information from the UE based on the (24, 8) code (block 418). Blocks 412 and 418 cover scenario 1 described above.

If the answer is 'Yes' for block 412, then the eNB may determine whether the UE is scheduled for one codeword with control information sent on the PDCCH (block 422). If the answer is 'Yes', then the eNB may send an assignment of one codeword on the PDCCH to the UE (block 424) and may send one codeword on the PDSCH to the UE (block 426). The eNB may then detect for only CQI information based on the (24, 8) code and also for both CQI and ACK information for one codeword based on the (24, 9) code (block 428). The detection for only CQI information based on the (24, 8) code covers scenario 3 in which the UE misses the PDCCH and sends only CQI information. The detection for both CQI and ACK information based on the (24, 9) code covers scenario 2 with one allocated codeword.

If the answer is 'No' for block 422, then the eNB may determine whether the UE is scheduled for two codewords with control information sent on the PDCCH (block 432). If the answer is 'Yes', then the eNB may send an assignment of two codewords on the PDCCH to the UE (block 434) and may send two codewords on the PDSCH to the UE (block 436). The eNB may then detect for only CQI information based on the (24, 8) code and also for both CQI and ACK information for two codewords based on the (24, 10) code (block 438). The detection for only CQI information based on the (24, 8) code covers scenario 3 in which the UE misses the PDCCH and sends only CQI information. The detection for both CQI and ACK information based on the (24, 10) code covers scenario 2 with two allocated codewords.

If the answer is 'No' for block 432, then the eNB may determine whether the UE is scheduled in the PDCCH-less mode (block 442). If the answer is 'Yes', then the eNB may send one codeword on the PDSCH to the UE (block 446). The eNB may then detect for only CQI information based on the (24, 8) code and also for both CQI and ACK information for one codeword based on the (24, 9) code (block 444). The detection for only CQI information based on the (24, 8) code covers scenario 4 with the UE decoding the codeword in error. The detection for both CQI and ACK information based on the (24, 9) code covers scenario 4 with the UE decoding the codeword correctly.

Figure 5:
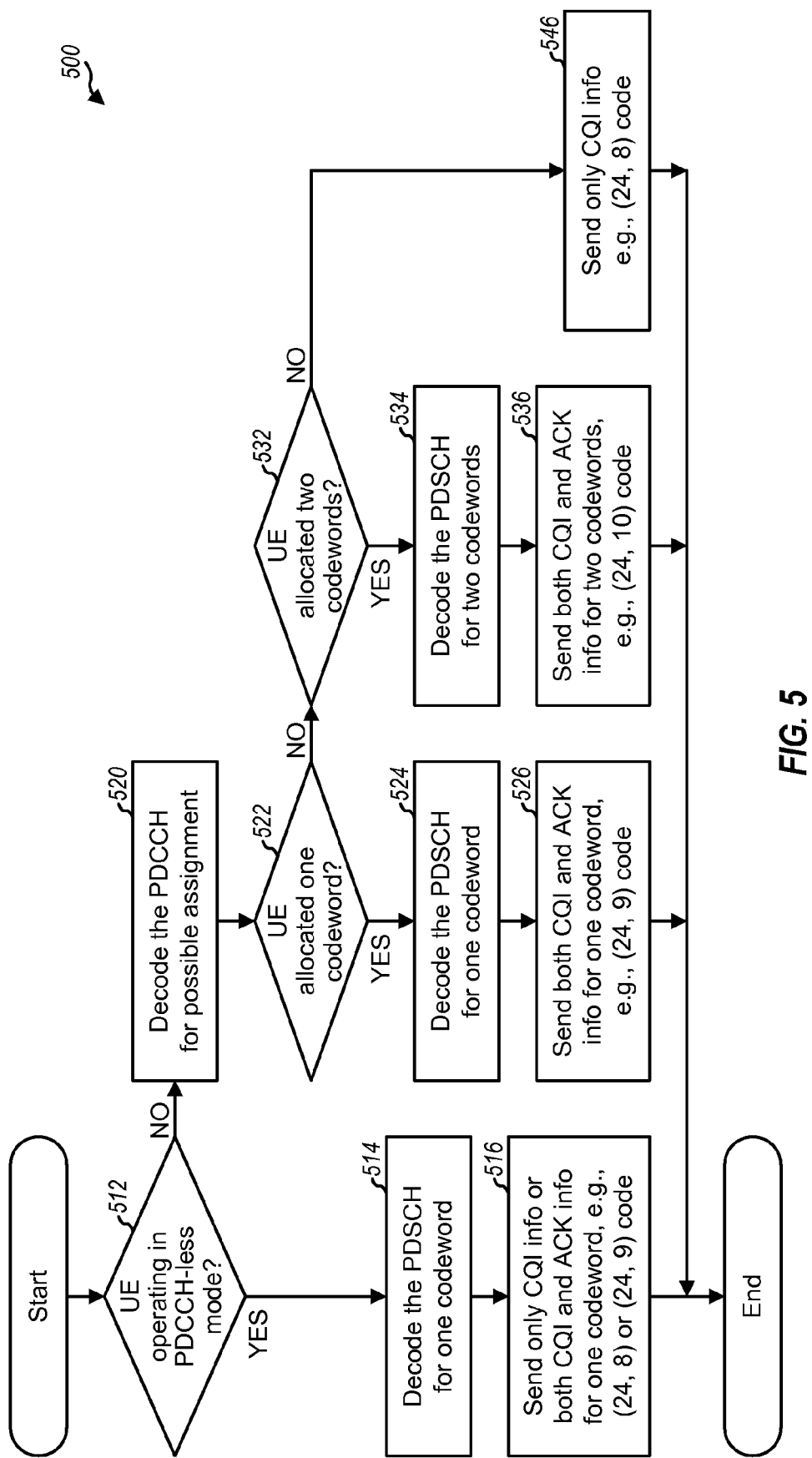
FIG. 5 shows a process for sending variable-size CQI and ACK information.

FIG. 5 shows a design of a process 500 performed by the UE to send CQI and ACK information. The UE may perform process 500 in each subframe in which data might be sent to the UE. The UE may initially determine whether the UE is operating in the PDCCH-less mode (block 512). If the answer is 'Yes', then the UE may blindly decode the PDSCH based on preconfigured parameters for one codeword (block 514). The UE may then send only CQI information using the (24, 8) code if a codeword is not decoded correctly or send both CQI and ACK information for one codeword using the (24, 9) code if a codeword is decoded correctly (block 516). Blocks 512 to 516 cover scenario 4 described above.

If the answer is 'No' for block 512, then the UE may decode the PDCCH to receive a possible assignment for the UE (block 520). The UE may then determine whether an assignment of one codeword has been received (block 522). If the answer is 'Yes', then the UE may decode the PDSCH for one codeword (block 524). The UE may then send both CQI and ACK information for one codeword using the (24, 9) code (block 526). If the answer is 'No' for block 522, then the UE may determine whether an assignment of two codewords has been received (block 532). If the answer is 'Yes', then the UE may decode the PDSCH for two codewords (block 534). The UE may then send both CQI and ACK information for two codewords using the (24, 10) code (block 536). Blocks 520 to 536 cover scenario 2 described above.

If the answer is 'No' for block 532, then the UE may send only CQI information using the (24, 8) code (block 546).

Block 546 covers scenario 1 in which the UE is not scheduled as well as scenario 3 in which the UE is scheduled but misses the PDCCH.

In the designs shown in FIGS. 4 and 5, the (24, 8), (24, 9) and (24, 10) codes may be designed such that the eNB can distinguish between the different codes being detected simultaneously. For blocks 428 and 448 in FIG. 4, the eNB may decode a transmission received from the UE to determine whether one of 256 possible values for the (24, 8) code was received from the UE or whether one of 512 possible values for the (24, 9) code was received from the UE. The (24, 8) and (24, 9) codes may thus be designed such that the eNB can distinguish between 768 possible values that might be received from the UE in blocks 428 and 448. Similarly, for block 438, the eNB may decode a transmission received from the UE to determine whether one of 256 possible values for the (24, 8) code was received from the UE or whether one of 1024 possible values for the (24, 10) code was received from the UE. The (24, 8) and (24, 10) codes may thus be designed such that the eNB can distinguish between 1280 possible values that might be received from the UE in block 438.

In another design, the UE may send ACK information for zero, one or two codewords using a fixed number of bits. This design may simplify operation by the UE and/or detection by the eNB.

For the PDCCH mode, ACK information for two codewords may convey one of the following states:

A1. UE missed the PDCCH and received no assignment,

A2. UE correctly decoded the PDCCH and correctly decoded both codewords,

A3. UE correctly decoded the PDCCH and correctly decoded only $1^{st}$ codeword, A4. UE correctly decoded the PDCCH and correctly decoded only $2^{nd}$ codeword, A5. UE correctly decoded the PDCCH but decoded both codewords in error.

For the PDCCH mode, ACK information for one codeword may convey one of the following states:

B1. UE missed the PDCCH and received no assignment,

B2. UE correctly decoded the PDCCH but decoded $1^{st}$ codeword in error,

B3. UE correctly decoded the PDCCH and correctly decoded $1^{st}$ codeword,

B4. UE correctly decoded the PDCCH but decoded $2^{nd}$ codeword in error,

B5. UE correctly decoded the PDCCH and correctly decoded $2^{nd}$ codeword.

For the PDCCH-less mode, state B2 may be used to indicate that a codeword was not decoded correctly by the UE, and state B3 may be used to indicate that a codeword was decoded correctly by the UE.

FIG. 6 shows four formats for CQI and ACK information with a fixed size. Each of these formats includes eight bits for CQI information and two bits for ACK information. Table 2 gives the definition of the two ACK bits for each of formats 610, 620 and 630, which may be used for the case in which two codewords are allocated to the UE.

TABLE 2

ACK information for two codewords

| ACK Bits | Format 610 | Format 620 | Format 630 |
|---|---|---|---|
| [0, 0] | Missed PDCCH | Missed PDCCH | Missed PDCCH or NAKs for both codewords |
| [0, 1] | ACKs for both codewords | ACKs for both codewords | ACK for only $2^{nd}$ codeword |
| [1, 0] | ACK for only $1^{st}$ codeword | ACK for only $2^{nd}$ codeword | ACK for only $1^{st}$ codeword |
| [1, 1] | NAKs for both codewords | NAKs for both codewords | ACKs for both codewords |

Table 3 gives the definition of the two ACK bits for format 640, which may be used for the case in which one codeword is allocated to the UE.

TABLE 3

ACK information for one codeword

| ACK Bits | Format 640 |
|---|---|
| [0, 0] | Missed PDCCH |
| [x, 1] | x = 1 for ACK or x = 0 for NAK for $1^{st}$ codeword |
| [1, x] | x = 1 for ACK or x = 0 for NAK for $2^{nd}$ codeword |

For format 610, the two ACK bits can convey states A1, A2, A3 and A5 described above, where [0, 0] conveys state A1, [0, 1] conveys state A2, [1, 0] conveys state A3, and [1, 1] conveys state A5. State A4 may be disregarded and/or included in another state. For example, state A4 may be included in state A5 and considered as another failure case. Format 610 supports cumulative ACK, which may be especially applicable if the UE supports successive interference cancellation (SIC). For SIC, the UE initially decodes the first codeword. If the first codeword is decoded correctly, then the UE estimates and cancels the interference due to this codeword, and then decodes the second codeword. If the first codeword is decoded in error, then the likelihood of correctly decoding the second codeword may be small (if the UE attempts decoding this codeword) or zero (if the UE does not attempt decoding this codeword).

For format 620, the two ACK bits can convey states A1, A2, A4 and A5, where [0, 0] conveys state A1, [0, 1] conveys state A2, [1, 0] conveys state A4, and [1, 1] conveys state A5. State A3 may be disregarded and/or included in another state. For example, state A3 may be included in state A5 and considered as another failure case.

For format 630, the two ACK bits can convey states A1, A2, A3, A4 and A5, where [0, 0] conveys states A1 and A5, [0, 1] conveys state A4, [1, 0] conveys state A3, and [1, 1] conveys state A2. States A1 and A5 may be combined, as shown in Table 2. States A1 and A5 may also be distinguished in other manners, as described below.

For format 640, the two ACK bits can convey states B1, B2, B3, B4 and B5, where [0, 0] conveys state B1, [0, 1] conveys state B2, [1, 0] conveys state B4, and [1, 1] conveys state B3 or B5. Since at most only one of states B3 and B5 can occur, there is no ambiguity in using [1, 1] for both states B3 and B5.

When two codewords are allocated, all five states A1 through A5 may be conveyed in several manners. In one design, four states may be conveyed by two ACK bits, and a fifth state may be conveyed with one value of the CQI information. For example, values 0 to 254 may be used to convey CQI information, and value 255 may be used to convey the fifth state. In another design, the fifth state may be conveyed using the three bits for the delta CQI, and the base CQI may be sent concurrently with the fifth state. For both designs, whenever the fifth state is sent, all or part of CQI information may be overridden by ACK information. An unlikely state may be selected as the fifth state, so that CQI information is overridden infrequently.

For scenario 1, the eNB does not transmit an assignment for the UE on the PDCCH. The UE may send [0, 0] for the ACK information with format 610, 620 or 630.

For scenario 2, the eNB transmits an assignment for the UE on the PDCCH and the UE correctly decodes the PDCCH. If only the first codeword is allocated, then the UE may send [x, 1] for the ACK information, where x=1 if the first codeword is decoded correctly and x=0 if the first codeword is decoded in error. This distinguishes a NAK for the first codeword (which is [0, 1]) from the case in which the UE misses the PDCCH (which is [0, 0]). If only the second codeword is allocated, then the UE may send [1, x] for the ACK information, where x=1 if the second codeword is decoded correctly and x=0 if the second codeword is decoded in error. This distinguishes a NAK for the second codeword (which is [1, 0]) from the case in which the UE misses the PDCCH (which is [0, 0]). If two codewords are allocated, then the UE may send [0, 1], [1, 0] or [1, 1] for the ACK information with format 610 or 620 and may send [0, 0], [0, 1], [1, 0] or [1, 1] for the ACK information with format 630.

For scenario 3, the eNB transmits an assignment for the UE on the PDCCH but the UE misses the PDCCH. The UE may then send [0, 0] for the ACK information with format 610, 620 or 630.

Figure 7:
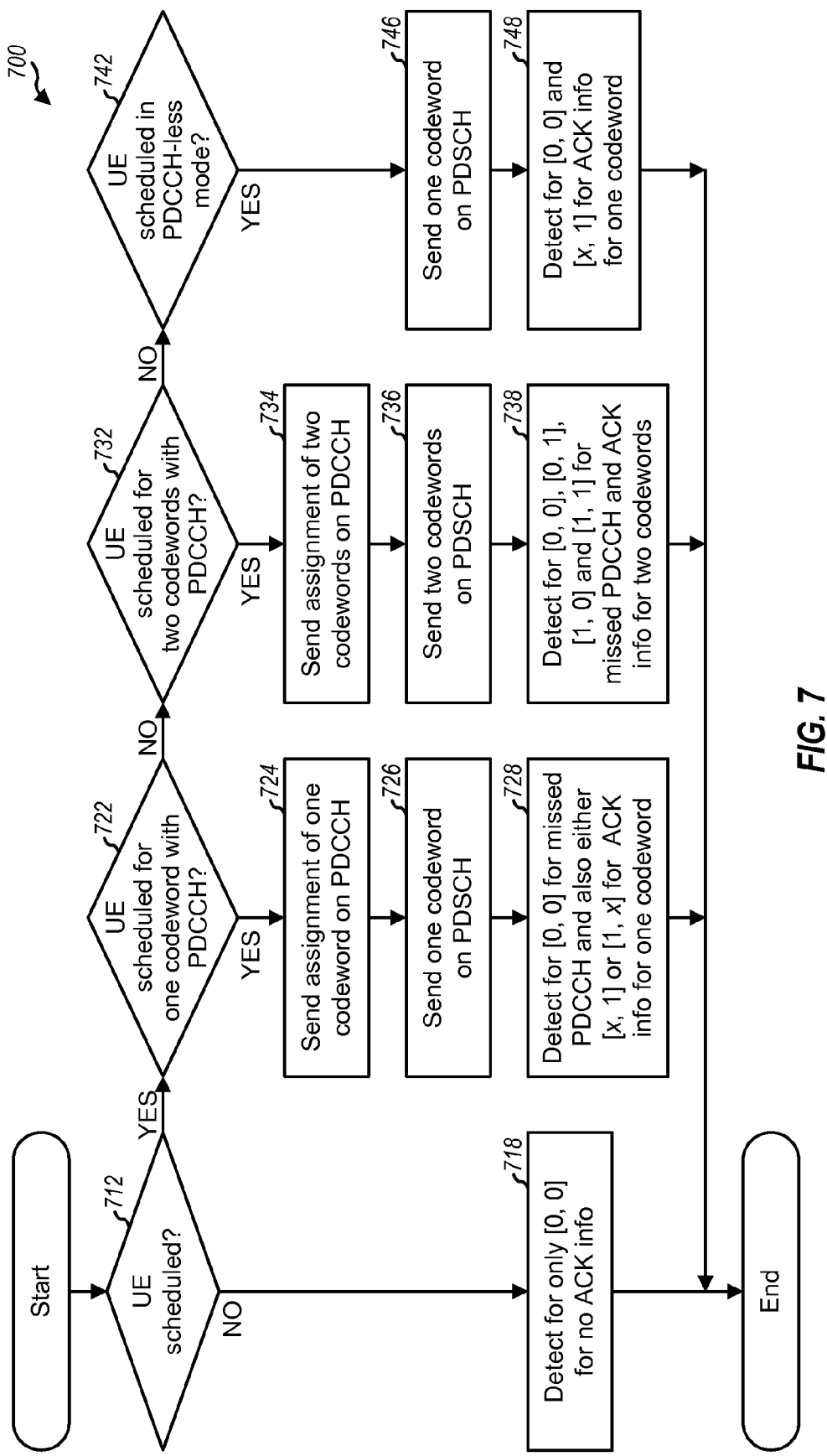
FIG. 7 shows a process for receiving fixed-size ACK information.

FIG. 7 shows a design of a process 700 performed by the eNB to receive ACK information with a fixed number of bits. The eNB may perform process 700 in each subframe in which data might be sent to the UE. The eNB may initially determine whether the UE is scheduled for downlink transmission (block 712). If the answer is 'No', then the eNB may detect for only [0, 0] for no ACK information (block 718). Blocks 712 and 718 cover scenario 1 described above.

If the answer is 'Yes' for block 712, then the eNB may determine whether the UE is scheduled for one codeword with control information sent on the PDCCH (block 722). If the answer is 'Yes', then the eNB may send an assignment of one codeword on the PDCCH to the UE (block 724) and may send one codeword on the PDSCH to the UE (block 726). The eNB may then detect for [0, 0] and also either [x, 1] or [1, x] for ACK information with one allocated codeword (block 728). The detection for [0, 0] covers scenario 3 in which the UE misses the PDCCH. The detection for [x, 1] covers scenario 2 with the first codeword allocated to the UE. The detection for [1, x] covers scenario 2 with the second codeword allocated to the UE.

If the answer is 'No' for block 722, then the eNB may determine whether the UE is scheduled for two codewords with control information sent on the PDCCH (block 732). If the answer is 'Yes', then the eNB may send an assignment of two codewords on the PDCCH to the UE (block 734) and may send two codewords on the PDSCH to the UE (block 736). The eNB may then detect for [0, 0], [0, 1], [1, 0] and [1, 1] for ACK information with two allocated codewords (block 738). Four 2-bit values for the ACK information may be defined as shown in Table 2 and may be dependent on the format selected for use. For example, a detected value of [0, 1] may have different meanings depending on whether format 610, 620 or 630 is selected for use. The eNB may be able to distinguish between missed PDCCH and NAK for both codewords with format 610 or 620 and may not be able to distinguish between missed PDCCH and both NAKs with format 630.

If the answer is 'No' for block 732, then the eNB may determine whether the UE is scheduled in the PDCCH-less mode (block 742). If the answer is 'Yes', then the eNB may send one codeword on the PDSCH to the UE (block 746). The eNB may then detect for [0, 0] and [x, 1] for ACK information with one allocated codeword (block 748).

Figure 8:
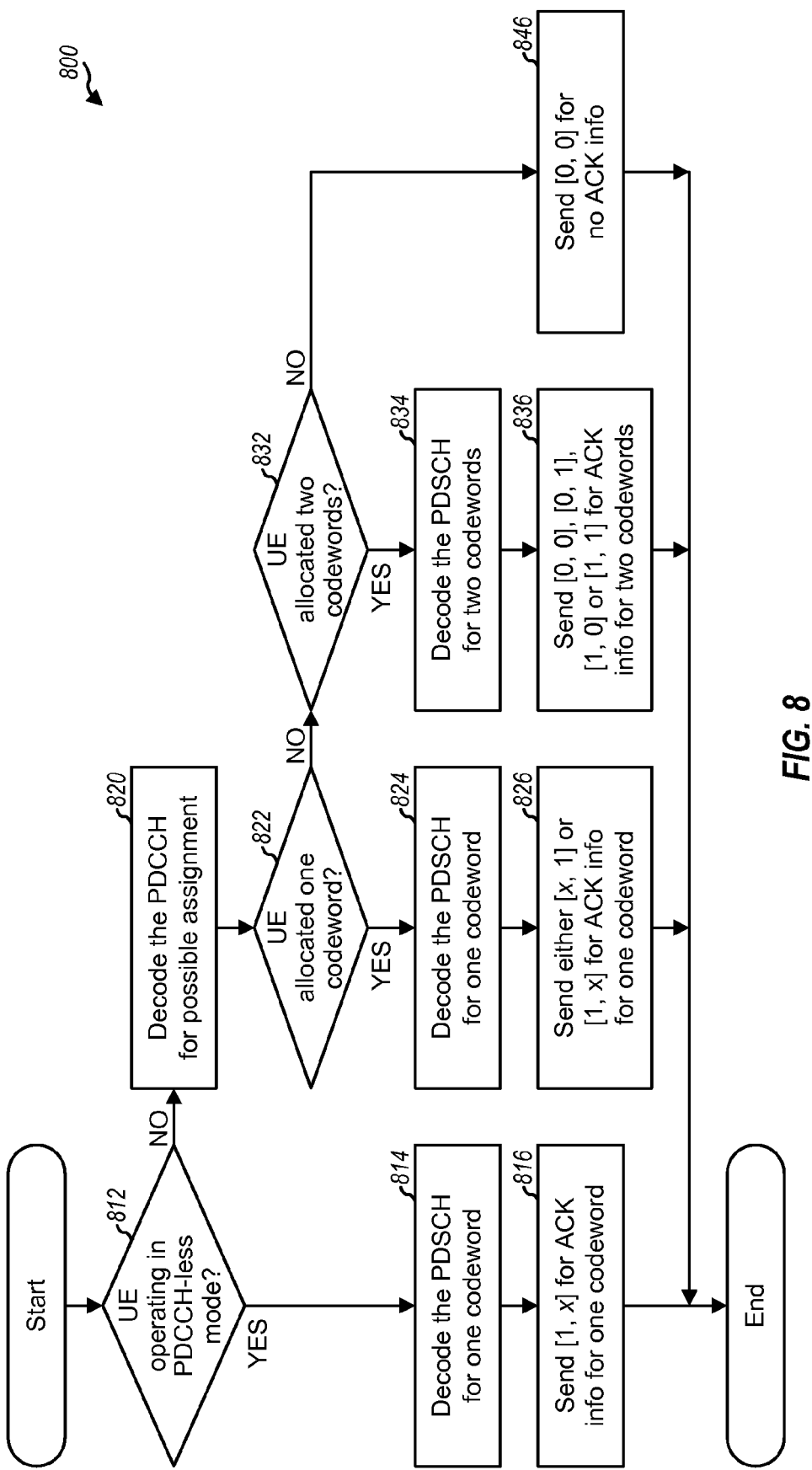
FIG. 8 shows a process for sending fixed-size ACK information.

FIG. 8 shows a design of a process 800 performed by the UE to send ACK information. The UE may perform process 800 in each subframe in which data might be sent to the UE. The UE may initially determine whether the UE is operating in the PDCCH-less mode (block 812). If the answer is 'Yes', then the UE may blindly decode the PDSCH based on preconfigured parameters for one codeword (block 814). The UE may then send [x, 1] for ACK information for one codeword (block 816). Blocks 812 to 816 cover scenario 4 described above.

If the answer is 'No' for block 812, then the UE may decode the PDCCH for a possible assignment for the UE (block 820). The UE may then determine whether an assignment of one codeword has been received (block 822). If the answer is 'Yes', then the UE may decode the PDSCH for one codeword (block 824). The UE may then send [x, 1] or [1, x] for ACK information for one codeword (block 826). If the answer is 'No' for block 822, then the UE may determine whether an assignment of two codewords has been received (block 832). If the answer is 'Yes', then the UE may decode the PDSCH for two codewords (block 834). The UE may then send [0, 0], [0, 1], [1, 0] or [1, 1] for ACK information for two codewords (block 836). Blocks 820 to 836 cover scenario 2 described above.

If the answer is 'No' for block 832, then the UE may send [0, 0] for ACK information for no codewords (block 846). Block 846 covers scenario 1 in which the UE is not scheduled as well as scenario 3 in which the UE is scheduled but misses the PDCCH.

FIGS. 4, 5, 7 and 8 are for a design in which the UE may be scheduled with one or two codewords in the PDCCH mode and with at most one codeword in the PDCCH-less mode. The UE may also be scheduled in other manners and/or for more codewords. For example, the eNB may send more than two codewords to the UE in the PDCCH mode and/or more than one codeword in the PDCCH-less mode. In this case, the UE may send ACK information for all codewords received by the UE. The eNB may detect for ACK information for different possible number of codewords that might be sent to the UE.

Figure 9:
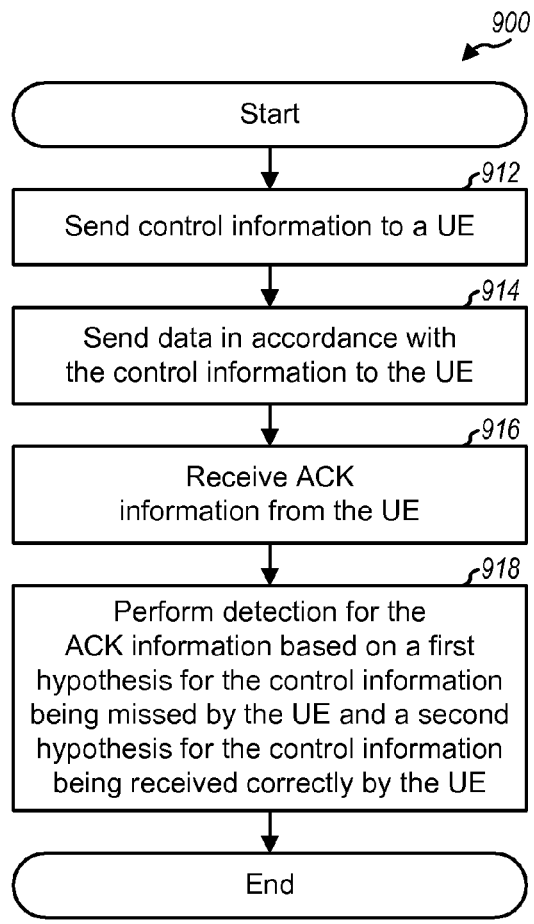
FIG. 9 shows a process for receiving ACK information.

FIG. 9 shows a design of a process 900 performed by an eNB or some other entity to receive ACK information. The eNB may send control information to a UE (block 912) and may send data in accordance with the control information to the UE (block 914). The eNB may receive ACK information from the UE (block 916). The eNB may also receive CQI information along with the ACK information from the UE. The CQI and ACK information may be jointly encoded by the UE based on a block code. The eNB may perform detection for the ACK information based on a first hypothesis for the control information being missed by the UE and a second hypothesis for the control information being received correctly by the UE (block 918).

In one design, the ACK information may have a variable size, e.g., as shown in FIG. 3. The eNB may perform detection for the ACK information based on a first block code (e.g., the (24, 8) code) for the first hypothesis. The eNB may perform detection for the ACK information based on a second block code (e.g., the (24, 9) or (24,10) code) for the second hypothesis. The eNB may send one or two codewords of data to the UE. The eNB may perform detection for the ACK information based on one block code (e.g., the (24, 9) code) if one codeword is sent and based on another block code (e.g., the (24, 10) code) if two codewords are sent. The eNB may obtain a first number of bits for the ACK information for the first hypothesis and may obtain a second number of bits for the ACK information for the second hypothesis. The second number of bits may be dependent on the number of codewords sent to the UE. In one design, the eNB may obtain zero bits of ACK information for the first hypothesis, one bit of ACK information if one codeword is sent, and two bits of ACK information if two codewords are sent to the UE.

In another design, the ACK information may have a fixed size, e.g., as shown in FIG. 6. The eNB may perform detection for the ACK information based on a single block code (e.g., the (24, 10) code) for both the first and second hypotheses. The eNB may obtain a fixed number of bits (e.g., two bits) for the ACK information for both hypotheses and regardless of the number of codewords sent to the UE. If two codewords are sent, then the two bits may be defined based on any of the formats shown in Table 2 or some other format. If one codeword is sent, then the two bits may be defined based on the format shown in Table 3 or some other format. One 2-bit value may be used to indicate that the control information is missed by the UE. The remaining 2-bit values may be used to convey the decoding status of one or two codewords. One or more values for ACK information may also be sent using one or more values for CQI information.

The eNB may also perform detection for the ACK information based on a third hypothesis when no control information and no data are sent to the UE. The UE may also perform detection for the ACK information based on another hypothesis when data but no control information is sent to the UE, e.g., in the PDCCH-less mode.

Figure 10:
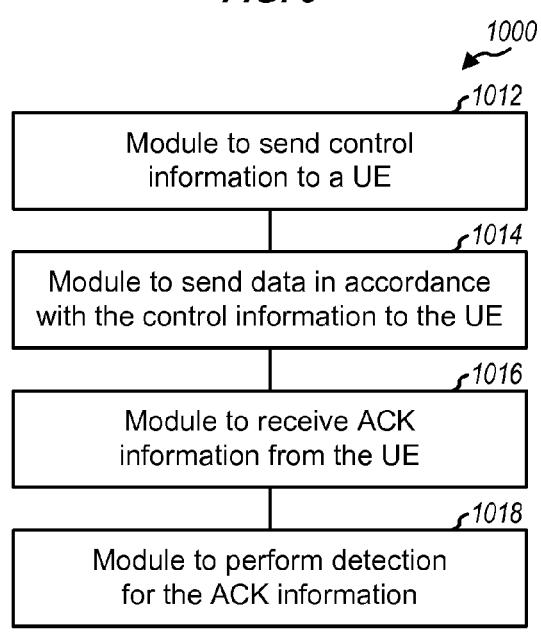
FIG. 10 shows an apparatus for receiving ACK information.

FIG. 10 shows a design of an apparatus 1000 for receiving ACK information. Apparatus 1000 includes a module 1012 to send control information to a UE, a module 1014 to send data in accordance with the control information to the UE, a module 1016 to receive ACK information from the UE, and a module 1018 to perform detection for the ACK information based on a first hypothesis for the control information being missed by the UE and a second hypothesis for the control information being received correctly by the UE.

Figure 11:
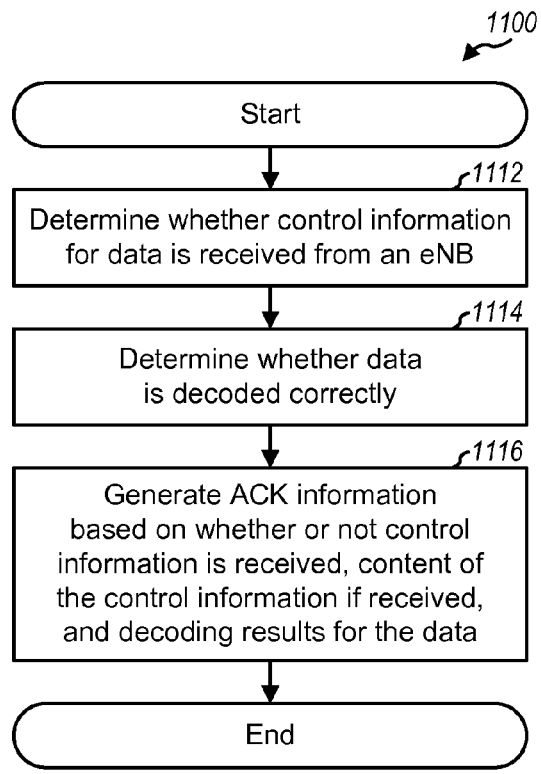
FIG. 11 shows a process for sending ACK information.

FIG. 11 shows a design of a process 1100 performed by a UE or some other entity to send ACK information. The UE may determine whether control information for data is received from an eNB (block 1112). The UE may also determine whether data is decoded correctly (block 1114). The UE may then generate ACK information based on whether or not control information is received, the content of the control information if received, and decoding results for the data (block 1116). The UE may jointly encode CQI information and the ACK information based on a block code and may then send the CQI and ACK information to the eNB.

In one design, the ACK information may have a variable size, e.g., as shown in FIG. 3. The UE may encode the ACK information based on a first block code (e.g., the (24, 8) code)

if control information is not received and based on a second block code (e.g., the (24, 9) or (24, 10) code) if the control information is received. The UE may encode the ACK information based on one block code (e.g., the (24, 9) code) if one codeword of data is received and based on another block code (e.g., the (24, 10) code) if two codewords of data are received. The UE may generate zero bits of ACK information if control information is not received, one bit of ACK information if one codeword of data is received, or two bits of ACK information if two codewords of data are received.

In another design, the ACK information may have a fixed size, e.g., as shown in FIG. 6. The UE may generate a fixed number of bits for the ACK information regardless of whether or not the control information is received and regardless of the number of codewords received. The UE may generate two bits for the ACK information, set the two bits to a first value (e.g., [0, 0]) if the control information is not received, and set the two bits to second, third or fourth value if the control information is received. The UE may select the second, third or fourth value for the two bits based on whether one or two codewords are received and decoding results for the one or two codewords.

Figure 12:
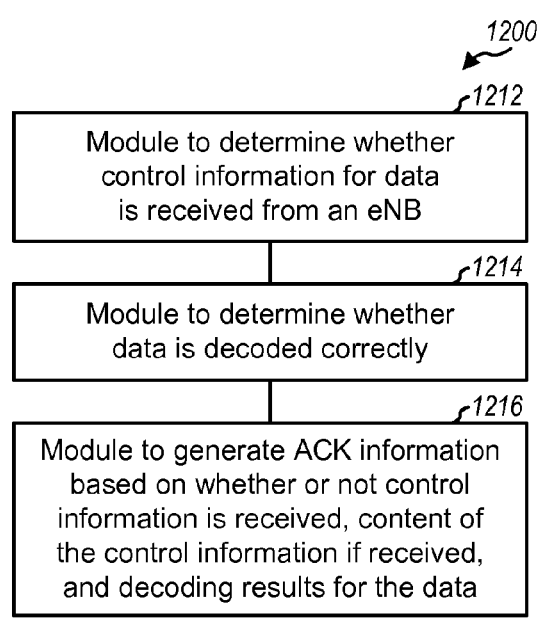
FIG. 12 shows an apparatus for sending ACK information.

FIG. 12 shows a design of an apparatus 1200 for sending ACK information. Apparatus 1200 includes a module 1212 to determine whether control information for data is received from an eNB, a module 1214 to determine whether data is decoded correctly, and a module 1216 to generate ACK information based on whether or not control information is received, the content of the control information if received, and decoding results for the data.

The modules in FIGS. 10 and 12 may comprise processors, electronics devices, hardware devices, electronics components, logical circuits, memories, etc., or any combination thereof.

Figure 13:
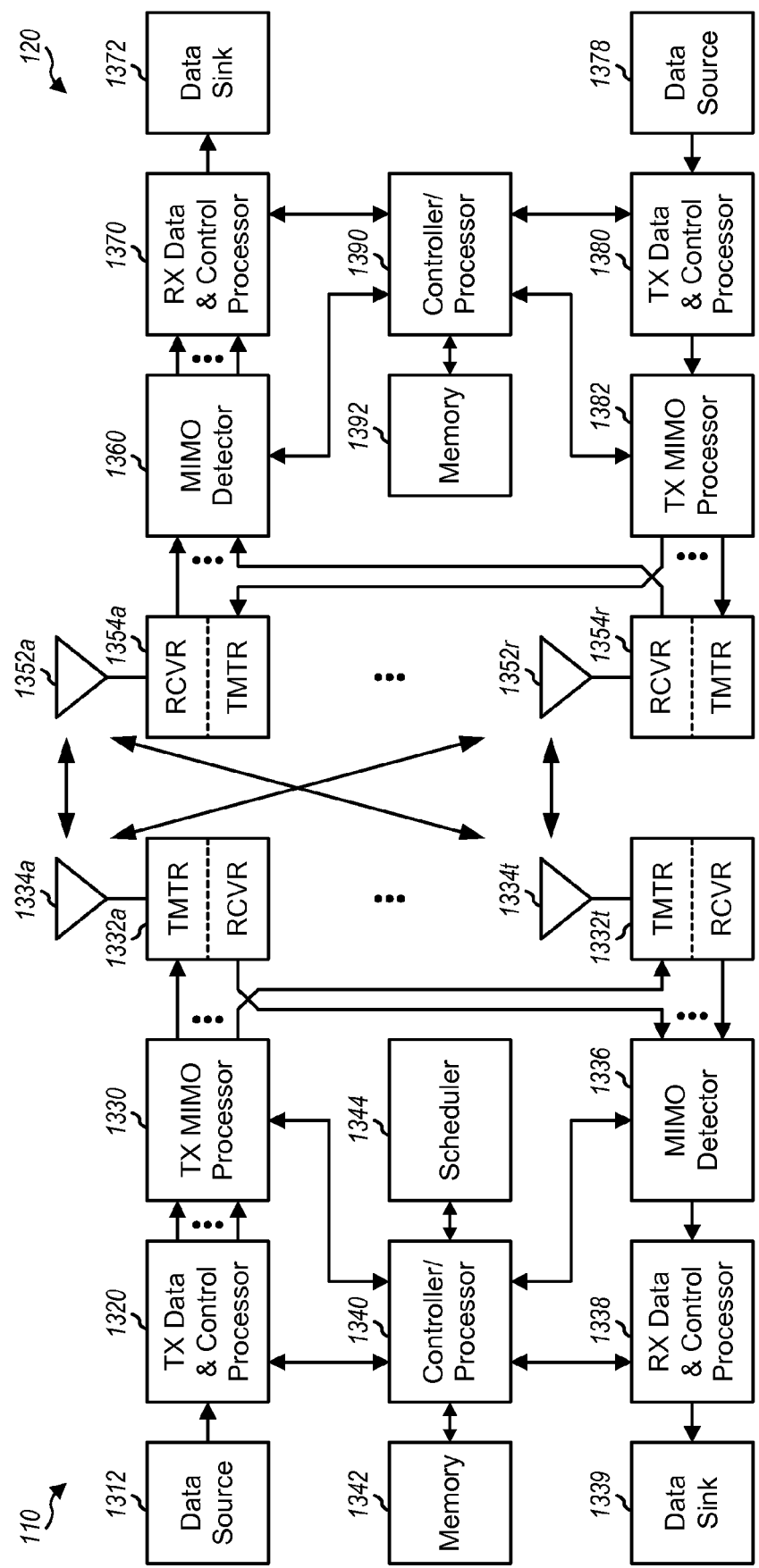
FIG. 13 shows a block diagram of a base station and a UE.

FIG. 13 shows a block diagram of a design of eNB 110 and UE 120. eNB 110 is equipped with T antennas 1334a through 1334t, and UE 120 is equipped with R antennas 1352a through 1352r, where in general T≥1 and R≥1.

At eNB 110, a transmit (TX) data and control processor 1320 may receive one or more transport blocks of data from a data source 1312, process (e.g., encode and symbol map) each transport block based on a modulation and coding scheme to obtain a corresponding codeword, and generate data symbols for each codeword. Processor 1320 may also process control information for the downlink (e.g., assignments) and generate control symbols. A TX MIMO processor 1330 may spatially process the data symbols, control symbol, and pilot symbols, if applicable, and provide T output symbol streams to T transmitters (TMTR) 1332a through 1332t. Each transmitter 1332 may process its output symbol stream (e.g., for OFDM) to obtain an output sample stream. Each modulator 1332 may further condition (e.g., convert to analog, filter, amplify, and upconvert) its output sample stream and generate a downlink signal. T downlink signals from transmitters 1332a through 1332t may be transmitted via antennas 1334a through 1334t, respectively.

At UE 120, R antennas 1352a through 1352r may receive the T downlink signals from eNB 110, and each antenna 1352 may provide a received signal to an associated receiver (RCVR) 1354. Each receiver 1354 may condition (e.g., filter, amplify, downconvert, and digitize) its received signal to obtain samples and may further process the samples (e.g., for OFDM) to obtain received symbols. A MIMO detector 1360 may perform MIMO detection on the received symbols and provide detected symbols. A receive (RX) data and control processor 1370 may process (e.g., symbol demap and decode) the detected symbols, provide decoded data for each codeword to a data sink 1372, and provide decoded control information to a controller/processor 1390.

Controller/processor 1390 may determine control information to send on the uplink, e.g., ACK information and/or CQI information. The uplink control information and data from a data source 1378 may be processed (e.g., encoded and symbol mapped) by a TX data and control processor 1380, spatially processed by a TX MIMO processor 1382 if applicable, and further processed by transmitters 1354a through 1354r to generate R uplink signals, which may be transmitted via antennas 1352a through 1352r. At eNB 110, the R uplink signals from UE 120 may be received by antennas 1334a through 1334t, processed by receivers 1332a through 1332t, detected by a MIMO detector 1336, and further processed (e.g., symbol demapped and decoded) by an RX data and control processor 1338 to recover the control information and data sent by UE 120. Processor 1338 may provide the decoded data to a data sink 1339 and provide decoded uplink control information to a controller/processor 1340. Controller/processor 1340 may control data transmission to UE 120 based on the uplink control information.

Controllers/processors 1340 and 1390 may direct the operation at eNB 110 and UE 120, respectively. Controller/processor 1340 may perform or direct process 400 in FIG. 4, process 700 in FIG. 7, process 900 in FIG. 9 and/or other processes for the techniques described herein. Controller/processor 1390 may perform or direct process 500 in FIG. 5, process 800 in FIG. 8, process 1100 in FIG. 11 and/or other processes for the techniques described herein. Memories 1342 and 1392 may store data and program codes for eNB 110 and UE 120, respectively. A scheduler 1344 may select UE 120 and/or other UEs for data transmission on the downlink and/or uplink.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. An apparatus for wireless communication, comprising:
    at least one processor; and
    a memory coupled to the at least one processor, wherein the at least one processor is configured to:
        send control information to a user equipment (UE);
        send data in accordance with the control information to the UE;
        receive acknowledgement (ACK) information including at least two bits from the UE related to the data, wherein the ACK information is encoded by the UE based on at least one block code, wherein the ACK information is received on a Physical Uplink Control Channel (PUCCH) at a time frequency location assigned for channel quality indicator (CQI) information if data is not sent on the uplink, wherein the ACK information is received on a Physical Uplink Shared Channel (PUSCH) if data is sent on the uplink, and wherein the ACK information is received at a variable time frequency location that is determined based on an identifier (ID) of a downlink virtual resource block (VRB) used to send data to the UE or an ID of a PDCCH used to send the control information to the UE; and
        perform detection for the ACK information based on the at least one block code for: a first hypothesis corresponding to a selected value of the at least two bits of the ACK information for indicating the control information being missed by the UE, and a second hypothesis corresponding to a set of selected values of the at least two bits of the ACK information for indicating whether the control information is received correctly by the UE.

2. The apparatus of claim 1, wherein the at least one processor is configured to receive channel quality indicator (CQI) information with the ACK information from the UE, the CQI and ACK information being jointly encoded by the UE based on the at least one block code.

3. The apparatus of claim 1, wherein the at least one processor is configured to:
    send one or two codewords of data to the UE;
    perform detection for the ACK information based on a first block code where one codeword of data is sent to the UE; and
    perform detection for the ACK information based on a second block code where two codewords of data are sent to the UE.

4. The apparatus of claim 1, wherein the at least one processor is configured to: obtain a first number of bits for the ACK information for the first hypothesis; and btain a second number of bits for the ACK information for the second hypothesis, the second number of bits being greater than the first number of bits.

5. The apparatus of claim 4, wherein the at least one processor is configured to send at least one codeword of data to the UE, and wherein the second number of bits is dependent on the number of codewords of data sent to the UE.

6. The apparatus of claim 1, wherein the at least one processor is configured to:
    send one or two codewords of data to the UE;
    obtain no bits for the ACK information for the first hypothesis;
    obtain one bit for the ACK information for the second hypothesis where one codeword of data is sent to the UE; and
    obtain two bits for the ACK information for the second hypothesis where two codewords of data are sent to the UE.

7. The apparatus of claim 1, wherein the at least one processor is configured to perform detection for the ACK information based on a single block code for both the first and second hypotheses.

8. The apparatus of claim 1, wherein the at least one processor is configured to obtain a fixed number of bits for the ACK information for both the first and second hypotheses.

9. The apparatus of claim 1, wherein the at least one processor is configured to:
send at least one codeword of data to the UE; and
receive a fixed number of bits for the ACK information regardless of the number of codewords of data sent to the UE.

10. The apparatus of claim 1, wherein the at least one processor is configured to:
send two codewords of data to the UE;
obtain two bits for the ACK information from the UE;
detect for the selected value represented by a first value of the two bits for the ACK information for the first hypothesis;
detect for the set of selected values represented by second, third and fourth values of the two bits for the ACK information for the second hypothesis;
determine that the control information is missed by the UE where the first value is detected; and
determine decoding status of the two codewords of data based on the second, third and fourth values of the two bits for the ACK information.

11. The apparatus of claim 10, wherein the at least one processor is configured to determine that the two codewords of data are decoded correctly by the UE where the second value is detected.

12. The apparatus of claim 10, wherein the at least one processor is configured to determine that the two codewords of data are decoded in error by the UE where the third value is detected.

13. The apparatus of claim 10, wherein the at least one processor is configured to determine that only one of the two codewords of data is decoded correctly by the UE where the fourth value is detected.

14. The apparatus of claim 10, wherein the at least one processor is configured to:
receive M bits for channel quality indicator (CQI) information with the two bits for the ACK information from the UE, where M is one or greater; and
detect for a fifth value for the ACK information based on the M bits for the CQI information.

15. The apparatus of claim 1, wherein the at least one processor is configured to:
send one codeword of data to the UE, to obtain two bits for the ACK information from the UE;
detect for the selected value represented by a first value of the two bits for the ACK information for the first hypothesis;
detect for the set of selected values represented by second and third values of the two bits for the ACK information for the second hypothesis;
determine that the control information is missed by the UE where the first value is detected;
determine that the one codeword of data is decoded correctly by the UE where the second value is detected; and
determine that the one codeword of data is decoded in error by the UE where the third value is detected.

16. The apparatus of claim 1, wherein the at least one processor is configured to perform detection for the ACK information based on a third hypothesis when no control information and no data are sent to the UE.

17. The apparatus of claim 1, wherein the at least one processor is configured to perform detection for the ACK information based on a third hypothesis when data but no control information is sent to the UE.

18. The apparatus of claim 1, wherein the ACK information is variable in size.

19. The apparatus of claim 18, wherein the size of the ACK information is based on a number of codewords of data transmitted to the UE.

20. The apparatus of claim 1, wherein the at least one processor is configured to:
send a plurality of codewords of data to the UE; and
obtain a plurality of bits for the ACK information from the UE.

21. The apparatus of claim 20, wherein the at least one processor is configured to:
detect for a first set of values of the plurality of bits for the ACK information for the first hypothesis; and
detect for a second set of values of the plurality of bits for the ACK information for the second hypothesis.

22. The apparatus of claim 21, wherein the at least one processor is configured to:
determine that the control information is missed by the UE where the first set of values is detected.

23. The apparatus of claim 22, wherein the at least one processor is configured to:
determine decoding status of the plurality of codewords of data based on the second set of values of the plurality of bits for the ACK information.

24. A method for wireless communication, comprising:
sending control information to a user equipment (UE);
sending data in accordance with the control information to the UE;
receiving acknowledgement (ACK) information including at least two bits from the UE related to the data, wherein the ACK information is encoded by the UE based on at least one block code, wherein the ACK information is received on a Physical Uplink Control Channel (PUCCH) at a time frequency location assigned for channel quality indicator (CQI) information if data is not sent on the uplink, wherein the ACK information is received on a Physical Uplink Shared Channel (PUSCH) if data is sent on the uplink, and wherein the ACK information is received at a variable time frequency location that is determined based on an identifier (ID) of a downlink virtual resource block (VRB) used to send data to the UE or an ID of a PDCCH used to send the control information to the UE; and
performing detection for the ACK information based on the at least one block code for: a first hypothesis corresponding to a selected value of the at least two bits of the ACK information for indicating the control information being missed by the UE, and a second hypothesis corresponding to a set of selected values of the at least two bits of the ACK information for indicating whether the control information is received correctly by the UE.

25. The method of claim 24, wherein the performing detection includes:
performing detection for the ACK information based on a first block code for the first hypothesis;
performing detection for the ACK information based on a second block code for the second hypothesis;
obtaining a first number of bits for the ACK information for the first hypothesis; and
obtaining a second number of bits for the ACK information for the second hypothesis, the second number of bits being greater than the first number of bits.

26. The method of claim 24, wherein the performing detection includes:
    performing detection for the ACK information based on a first block code where one codeword of data is sent to the UE; and
    performing detection for the ACK information based on a second block code where two codewords of data are sent to the UE.

27. The method of claim 24, wherein the performing detection includes:
    performing detection for the ACK information based on a single block code for both the first and second hypotheses; and
    obtaining a fixed number of bits for the ACK information for both the first and second hypotheses.

28. The method of claim 24, wherein the sending data includes sending two codewords of data to the UE, and wherein the performing detection includes:
    obtaining two bits for the ACK information from the UE;
    detecting for the selected value represented by a first value of the two bits for the ACK information for the first hypothesis;
    detecting for the set of selected values represented by second, third and fourth values of the two bits for the ACK information for the second hypothesis;
    determining that the control information is missed by the UE where the first value is detected; and
    determining decoding status of the two codewords of data based on the second, third and fourth values of the two bits for the ACK information.

29. The method of claim 24, wherein the sending data includes sending one codeword of data to the UE, and wherein the performing detection includes:
    obtaining two bits for the ACK information from the UE;
    detecting for the selected value represented by a first value of the two bits for the ACK information for the first hypothesis;
    detecting for the set of selected values represented by second and third values of the two bits for the ACK information for the second hypothesis;
    determining that the control information is missed by the UE where the first value is detected;
    determining that the one codeword of data is decoded correctly by the UE where the second value is detected; and
    determining that the one codeword of data is decoded in error by the UE where the third value is detected.

30. An apparatus for wireless communication, comprising:
    means for sending control information to a user equipment (UE);
    means for sending data in accordance with the control information to the UE;
    means for receiving acknowledgement (ACK) information including at least two bits from the UE related to the data, wherein the ACK information is encoded by the UE based on at least one block code, wherein the ACK information is received on a Physical Uplink Control Channel (PUCCH) at a time frequency location assigned for channel quality indicator (CQI) information if data is not sent on the uplink, wherein the ACK information is received on a Physical Uplink Shared Channel (PUSCH) if data is sent on the uplink, and wherein the ACK information is received at a variable time frequency location that is determined based on an identifier (ID) of a downlink virtual resource block (VRB) used to send data to the UE or an ID of a PDCCH used to send the control information to the UE; and
    means for performing detection for the ACK information based on the at least one block code for: a first hypothesis corresponding to a selected value of the at least two bits of the ACK information for indicating the control information being missed by the UE, and; a second hypothesis corresponding to a set of selected values of the at least two bits of the ACK information for indicating whether the control information is received correctly by the UE.

31. The apparatus of claim 30, wherein the means for performing detection:
    performs detection for the ACK information based on a first block code for the first hypothesis;
    performs detection for the ACK information based on a second block code for the second hypothesis;
    obtains a first number of bits for the ACK information for the first hypothesis; and
    obtains a second number of bits for the ACK information for the second hypothesis, the second number of bits being greater than the first number of bits.

32. The apparatus of claim 30, wherein the means for performing detection:
    performs detection for the ACK information based on a single block code for both the first and second hypotheses; and
    obtains a fixed number of bits for the ACK information for both the first and second hypotheses.

33. A non-transitory computer-readable medium, comprising code for causing at least one computer to:
    send control information to a user equipment (UE);
    send data in accordance with the control information to the UE;
    receive acknowledgement (ACK) information including at least two bits from the UE related to the data, wherein the ACK information is encoded by the UE based on at least one block code, wherein the ACK information is received on a Physical Uplink Control Channel (PUCCH) or at a time frequency location assigned for channel quality indicator (CQI) information if data is not sent on the uplink, wherein the ACK information is received on a Physical Uplink Shared Channel (PUSCH) if data is sent on the uplink, and wherein the ACK information is received at a variable time frequency location that is determined based on an identifier (ID) of a downlink virtual resource block (VRB) used to send data to the UE or an ID of a PDCCH used to send the control information to the UE; and
    perform detection for the ACK information based on the at least one block code for: a first hypothesis corresponding to a selected value of the at least two bits of the ACK information for indicating the control information being missed by the UE, and a second hypothesis corresponding to a set of selected values of the at least two bits of the ACK information for indicating whether the control information is received correctly by the UE.

34. The non-transitory computer-readable medium of claim 33, further comprising code for causing the at least one computer to:
    perform detection for the ACK information based on a first block code for the first hypothesis;
    perform detection for the ACK information based on a second block code for the second hypothesis;
    obtain a first number of bits for the ACK information for the first hypothesis; and
    obtain a second number of bits for the ACK information for the second hypothesis, the second number of bits being greater than the first number of bits.

35. The non-transitory computer-readable medium of claim 33, further comprising code for causing the at least one computer to:
 perform detection for the ACK information based on a single block code for both the first and second hypotheses; and
 obtain a fixed number of bits for the ACK information for both the first and second hypotheses.

36. The apparatus of claim 1, wherein the at least one processor is configured to perform detection for the ACK information based on whether or not control information for the data is sent to the UE and content of the control information where sent.

37. The apparatus of claim 36, wherein the at least one processor is configured to:
 send the control information indicating number of codewords of data allocated to the UE; and
 perform detection for the ACK information based on a number of codewords of data allocated to the UE.

38. The apparatus of claim 36, wherein the at least one processor is configured to:
 send no control information for the data to the UE; and
 perform detection for the ACK information based on no control information being sent to the UE.

39. An apparatus for wireless communication, comprising:
 at least one processor; and
 a memory coupled to the at least one processor, wherein the at least one processor is configured to:
  determine whether control information for data is received;
  determine whether data is decoded correctly;
  generate acknowledgement (ACK) information including at least two bits for the data based on whether or not control information is received, a content of the control information where received, and decoding results for the data;
  encode the ACK information based on a selected value of the at least two bits of the ACK information for indicating that the control information is not received;
  encode the ACK information based on a set of selected values of the at least two bits of the ACK information for indicating whether the control information is received correctly; and
  send the ACK information, wherein the ACK information is sent on a Physical Uplink Control Channel (PUCCH) at a time frequency location assigned for channel quality indicator (CQI) information if data is not sent on the uplink, wherein the ACK information is sent on a Physical Uplink Shared Channel (PUSCH) if data is sent on the uplink, and wherein the ACK information is sent at a variable time frequency location that is determined based on an identifier (ID) of a downlink virtual resource block (VRB) used to send data to the UE or an ID of a PDCCH used to send the control information to the UE.

40. The apparatus of claim 39, wherein the at least one processor is configured to:
 encode the ACK information based on a first block code where one codeword of data is received; and
 encode the ACK information based on a second block code where two codewords of data are received.

41. The apparatus of claim 39, wherein the at least one processor is configured to:
 generate no bits for the ACK information where the control information is not received;
 generate one bit for the ACK information where one codeword of data is received; and
 generate two bits for the ACK information where two codewords of data are received.

42. The apparatus of claim 39, wherein the at least one processor is configured to generate a fixed number of bits for the ACK information regardless of whether or not the control information is received and regardless of a number of codewords of data received.

43. The apparatus of claim 39, wherein the at least one processor is configured to:
 generate two bits for the ACK information;
 set the two bits to the selected value represented by a first value where the control information is not received;
 set the two bits to the set of selected values represented by second, third or fourth value where the control information is received; and
 select the second, third or fourth value for the two bits based on whether one or two codewords of data are received and decoding results for the one or two codewords of data.

44. The apparatus of claim 39, wherein the ACK information is variable in size.

45. The apparatus of claim 44, wherein the size of the ACK information is based on a number of codewords of data received.

46. A method for wireless communication, comprising:
 determining whether control information for data is received;
 determining whether data is decoded correctly; and
 generating acknowledgement (ACK) information including at least two bits for the data based on whether or not control information is received, content of the control information where received, and decoding results for the data;
 wherein the generating the ACK information includes:
  encoding the ACK information based on a selected value of the at least two bits of the ACK information for indicating that the control information is not received;
  encoding the ACK information based on a set of selected values of the at least two bits of the ACK information for indicating whether where the control information is received correctly; and
  sending the ACK information, wherein the ACK information is sent on a Physical Uplink Control Channel (PUCCH) at a time frequency location assigned for channel quality indicator (CQI) information if data is not sent on the uplink, wherein the ACK information is sent on a Physical Uplink Shared Channel (PUSCH) if data is sent on the uplink, and wherein the ACK information is sent at a variable time frequency location that is determined based on an identifier (ID) of a downlink virtual resource block (VRB) used to send data to the UE or an ID of a PDCCH used to send the control information to the UE.

47. The method of claim 46, wherein the generating the ACK information includes:
 encoding the ACK information based on a first block code where one codeword of data is received; and
 encoding the ACK information based on a second block code where two codewords of data are received.

48. The method of claim 46, wherein the generating the ACK information includes:
 generating no bits for the ACK information where the control information is not received;
 generating one bit for the ACK information where one codeword of data is received; and
 generating two bits for the ACK information where two codewords of data are received.

49. The method of claim 46, wherein the generating the ACK information includes:
  generating a fixed number of bits for the ACK information regardless of whether or not the control information is received and regardless of a number of codewords of data received.

50. The method of claim 46, wherein the generating the ACK information includes:
  generating two bits for the ACK information;
  setting the two bits to the selected value represented by a first value where the control information is not received;
  setting the two bits to the set of selected values represented by second, third or fourth value where the control information is received; and
  selecting the second, third or fourth value for the two bits based on whether one or two codewords of data are received and decoding results for the one or two codewords of data.

51. An apparatus for wireless communication, comprising:
  means for determining whether control information for data is received;
  means for determining whether data is decoded correctly;
  means for generating acknowledgement (ACK) information including at least two bits for the data based on whether or not control information is received, content of the control information where received, and decoding results for the data;
  wherein the means for generating the ACK information comprises:
    means for encoding the ACK information based on a selected value of the at least two bits of the ACK information for indicating that the control information is not received;
    means for encoding the ACK information based on a set of selected values of the at least two bits of the ACK information for indicating whether control information is received correctly; and
    means for sending the ACK information, wherein the ACK information is sent on a Physical Uplink Control Channel (PUCCH) at a time frequency location assigned for channel quality indicator (CQI) information if data is not sent on the uplink, wherein the ACK information is sent on a Physical Uplink Shared Channel (PUSCH) if data is sent on the uplink, and wherein the ACK information is sent at a variable time frequency location that is determined based on an identifier (ID) of a downlink virtual resource block (VRB) used to send data to the UE or an ID of a PDCCH used to send the control information to the UE.

52. A non-transitory computer-readable medium, comprising code for causing at least one computer to:
  determine whether control information for data is received;
  determine whether data is decoded correctly; and
  generate acknowledgement (ACK) information including at least two bits for the data based on whether or not control information is received, content of the control information where received, and decoding results for the data;
  wherein the code for generating the ACK information comprises:
    encode the ACK information based on a selected value of the at least two bits of the ACK information for indicating that the control information is not received;
    encode the ACK information based on a set of selected values of the at least two bits of the ACK information for indicating whether the control information is received correctly; and
    send the ACK information, wherein the ACK information is sent on a Physical Uplink Control Channel (PUCCH) at a time frequency location assigned for channel quality indicator (CQI) information if data is not sent on the uplink, wherein the ACK information is sent on a Physical Uplink Shared Channel (PUSCH) if data is sent on the uplink, and wherein the ACK information is sent at a variable time frequency location that is determined based on an identifier (ID) of a downlink virtual resource block (VRB) used to send data to the UE or an ID of a PDCCH used to send the control information to the UE.

* * * * *